US012786296B2

(12) United States Patent
Cheng et al.

(10) Patent No.: US 12,786,296 B2
(45) Date of Patent: Nov. 3, 2026

(54) ELECTRONIC DEVICE

(71) Applicant: VIVO MOBILE COMMUNICATION CO., LTD., Guangdong (CN)

(72) Inventors: Dongcun Cheng, Guangdong (CN); Rukun Zhong, Guangdong (CN); Xueting Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 222 days.

(21) Appl. No.: 18/899,720

(22) Filed: Sep. 27, 2024

(65) Prior Publication Data

US 2025/0023968 A1 Jan. 16, 2025

Related U.S. Application Data

(63) Continuation of application No. PCT/CN2023/084382, filed on Mar. 28, 2023.

(30) Foreign Application Priority Data

Mar. 29, 2022 (CN) ........................ 202210319315.7

(51) Int. Cl.
*H04M 1/02* (2006.01)
*G06F 1/16* (2006.01)

(52) U.S. Cl.
CPC ............ *H04M 1/0237* (2013.01); *G06F 1/16* (2013.01); *G06F 1/1624* (2013.01); *G06F 1/1652* (2013.01); *H04M 1/0268* (2013.01)

(58) Field of Classification Search
CPC .......................... H04M 1/0237; H04M 1/0268
See application file for complete search history.

(56) References Cited

U.S. PATENT DOCUMENTS

| | | | | |
|---|---|---|---|---|
| 8,041,407 | B2 * | 10/2011 | Wakihara | H04M 1/0237 361/814 |
| 11,891,022 | B2 * | 2/2024 | Lee | B60S 1/0837 |
| 11,956,379 | B2 * | 4/2024 | Li | H04M 1/0268 |
| 12,395,579 | B2 * | 8/2025 | Wang | H04M 1/0264 |
| 12,477,673 | B2 * | 11/2025 | Lee | C09J 9/00 |

(Continued)

FOREIGN PATENT DOCUMENTS

| | | |
|---|---|---|
| CN | 201766778 U | 3/2011 |
| CN | 208569472 U | 3/2019 |

(Continued)

OTHER PUBLICATIONS

European Search Report for Application No. 23778203.2, May 27, 2025, 9 pages.

(Continued)

*Primary Examiner* — Patrick F Marinelli
(74) *Attorney, Agent, or Firm* — BROOKS KUSHMAN P.C.

(57) ABSTRACT

An electronic device, including: a first support portion; a second support portion; and a guiding structure, where the guiding structure is connected to the first support portion and the second support portion, the guiding structure includes a first slider and a first chute, an end portion of the first slider is clamped into the first chute, and when the first slider slides in the first chute, the first support portion and the second support portion move relative to each other.

9 Claims, 5 Drawing Sheets

(56) References Cited

U.S. PATENT DOCUMENTS

| | | | | |
|---|---|---|---|---|
| 2005/0229191 | A1 | 10/2005 | Lee | |
| 2020/0413555 | A1 | 12/2020 | Ho et al. | |
| 2021/0373603 | A1* | 12/2021 | Feng | G06F 1/1624 |
| 2022/0011821 | A1* | 1/2022 | Han | G06F 1/1652 |
| 2022/0066510 | A1* | 3/2022 | Cha | G06F 1/1624 |
| 2022/0111821 | A1* | 4/2022 | Lee | B60S 1/0837 |
| 2022/0113764 | A1* | 4/2022 | Kwak | G06F 1/1652 |
| 2022/0417354 | A1* | 12/2022 | Li | H04M 1/0268 |
| 2024/0431048 | A1* | 12/2024 | Yoon | H04M 1/0237 |
| 2025/0023968 | A1* | 1/2025 | Cheng | H04M 1/0268 |

FOREIGN PATENT DOCUMENTS

| | | | |
|---|---|---|---|
| CN | 110493398 | A | 11/2019 |
| CN | 209954519 | U | 1/2020 |
| CN | 111508374 | A | 8/2020 |
| CN | 212173208 | U | 12/2020 |
| CN | 212519192 | U | 2/2021 |
| CN | 113099012 | A | 7/2021 |
| CN | 113325924 | A | 8/2021 |
| CN | 215495774 | U | 1/2022 |
| CN | 114710916 | A | 7/2022 |
| KR | 20100029401 | A | 3/2010 |

OTHER PUBLICATIONS

International Search Report and Written Opinion for PCT Application No. PCT/CN2023/084382, Mailed Jun. 14, 2023, 14 pages.
First Chinese Office Action for Chinese Patent Application No. 202210319315.7 dated Dec. 26, 2023. 15 pages.

* cited by examiner

ELECTRONIC DEVICE

CROSS-REFERENCE TO RELATED APPLICATIONS

This application is a continuation of International Application No. PCT/CN2023/084382 filed on Mar. 28, 2023, which claims priority to Chinese Patent Application No. 202210319315.7 filed on Mar. 29, 2022, which are incorporated herein by reference in their entireties.

TECHNICAL FIELD

This application relates to the field of communications technologies, and in particular, to an electronic device.

BACKGROUND

In recent years, mobile phones with a rollable screen have drawn extensive attention because they can better meet expectations of users for a large-screen, portable, and ease-of-operation mobile phone. In addition, compared with mobile phones with a foldable screen, mobile phones with a rollable screen further have the advantages of a small size, a light weight, good appearance, a controllable screen, and the like, and can meet the requirements of users in a plurality of scenarios such as communication, movie-watching, and gaming, providing better user experiences.

An existing rollable screen guide design mainly uses a rectangular chute and a block guide component (or guide bar) together. During screen extension and retraction, a slider fastened on a middle frame and a screen bracket moves relative to the chute, which acts as a guide for the extension and retraction of the rollable screen. However, in practical application, a large fitting gap between the rectangular chute and the guide component (or guide bar) allows for a high degree of freedom in the Y direction. It is difficult to ensure stable and smooth guidance during use, which is not conducive to smooth guidance of the rollable screen.

SUMMARY

According to a first aspect, an embodiment of this application provides an electronic device, including:

a first support portion;

a second support portion; and a guiding structure, where the guiding structure is connected to the first support portion and the second support portion, the guiding structure includes a first slider and a first chute, and an end portion of the first slider is clamped into the first chute; and when the first slider slides in the first chute, the first support portion and the second support portion move relative to each other.

BRIEF DESCRIPTION OF DRAWINGS

The foregoing and/or additional aspects and advantages of the present invention become apparent and are easily understood in descriptions of embodiments with reference to the following accompanying drawings.

Figure 1:
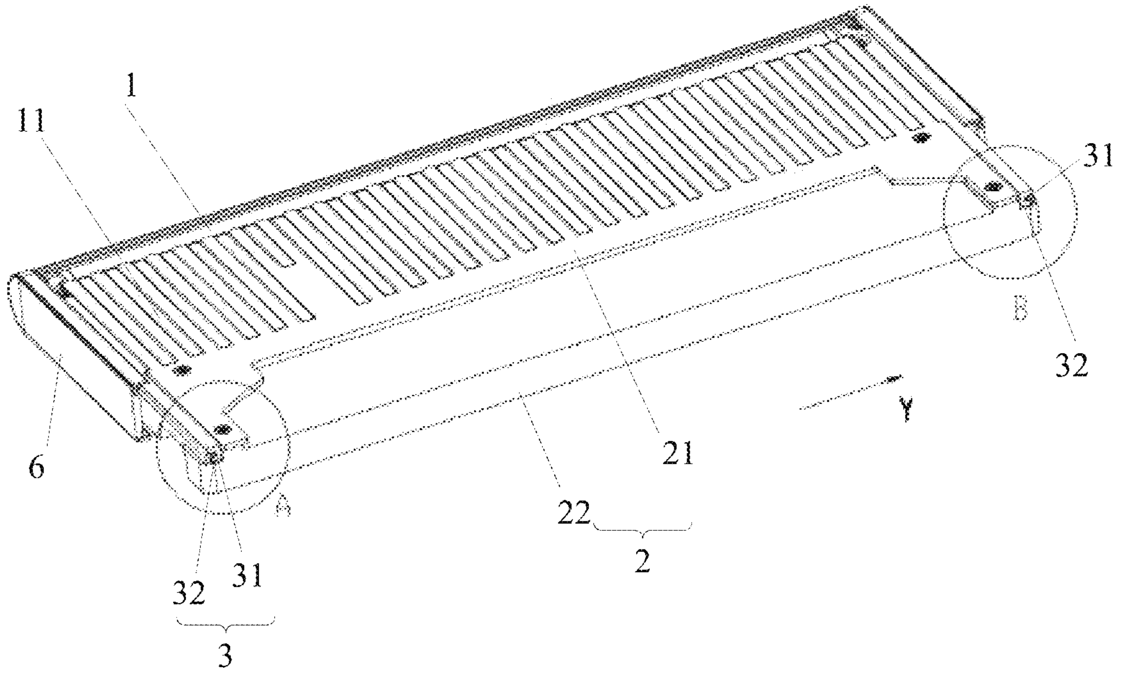
FIG. 1 is a first schematic structural diagram of an electronic device according to an embodiment of this application.

Descriptions of reference numerals: 1: first support portion; 2: second support portion; 3: guiding structure; 31: first slider; 32: first chute; 311: first guide bar; 312: second guide bar; 321: first chute body; 322: second chute body; 323: first plastic structure; 324: second plastic structure; 11: first comb bracket; 12: first support bracket; 21: second comb bracket; 22: second support bracket; 4: middle frame; 41: bottom plate; 42: side plate; 5: through hole; 6: first housing; and 7: second housing.

DETAILED DESCRIPTION

Embodiments of the present invention are described below in detail, and examples of the embodiments are shown in the accompanying drawings, where the same or similar reference numerals represent the same or similar components or components having the same or similar functions throughout. The embodiments described below with reference to the accompanying drawings are examples only for describing the present invention, and should not be construed as a limitation on the present invention. All other embodiments obtained by a person of ordinary skill in the art based on the embodiments of this application without creative efforts shall fall within the protection scope of this application.

In the specification and claims of this application, a feature described by using the term “first” or “second” may explicitly or implicitly include one or more features. In descriptions of the present invention, “a plurality of” means two or more, unless otherwise specified.

In descriptions of the present invention, it should be understood that orientations or location relationships indicated by the terms “center”, “longitudinal”, “transverse”, “length”, “width”, “thickness”, “up”, “down”, “front”, “rear”, “left”, “right”, “vertical”, “horizontal”, “top”, “bottom”, “inside”, “outside”, and the like are based on orientations or location relationships shown in the accompanying drawings, and are merely intended to facilitate description of the present invention and simplify description, but not to indicate or imply that an indicated apparatus or component needs to have a specific orientation or needs to be constructed or operated in a specific orientation, and therefore cannot be construed as a limitation on the present invention.

In descriptions of the present invention, it should be noted that, unless otherwise specified and limited, the terms “mounted”, “connected”, and “connection” should be understood in a broad sense. For example, a "connection" may be a fixed connection, a detachable connection, or an integrated connection; may be a mechanical connection or an electrical connection; or may be a direct connection, an indirect connection through an intermediate medium, or an internal connection between two components. A person of ordinary skill in the art may understand specific meanings of the foregoing terms in the present invention based on specific circumstances.

An electronic device according to an embodiment of the present invention is described below.

As shown in FIG. 1 to FIG. 9, the electronic device includes a first support portion 1, a second support portion 2, and a guiding structure 3.

Optionally, the first support portion 1 is connected to one end of a flexible display panel of the electronic device, and the second support portion 2 is connected to another end of the flexible display panel.

The guiding structure 3 is connected to the first support portion 1 and the second support portion 2, to guide the first support portion 1 and the second support portion 2 to move relative to each other, and drive the flexible display panel to retract or expand.

The guiding structure 3 includes a first slider 31 and a first chute 32. An end portion of the first slider 31 is clamped into the first chute 32. When the first slider 31 slides in the first chute 32, the first support portion 1 and the second support portion 2 move relative to each other.

Figure 2:
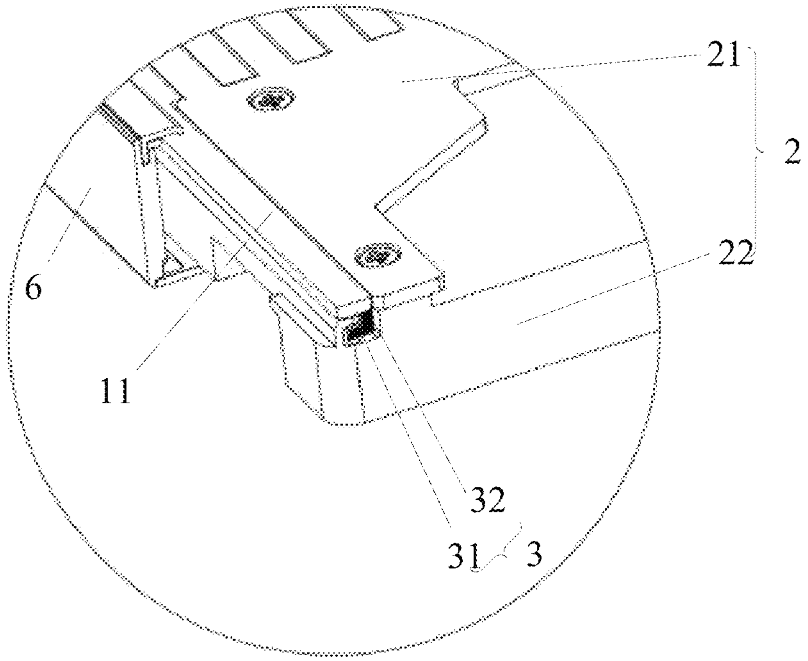
FIG. 2 is a first schematic enlarged view of a structure of part A in FIG. 1 according to an embodiment of this application.
Figure 3:
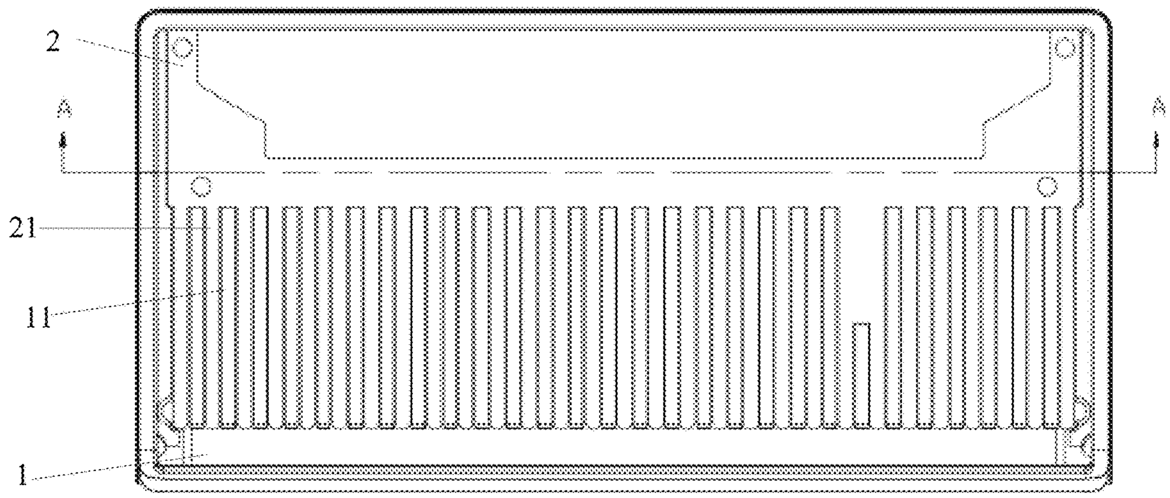
FIG. 3 is a schematic diagram of fitting between a first comb bracket and a second comb bracket according to an embodiment of this application.

FIG. 2 is a schematic enlarged view of a structure of part A in FIG. 1. The first slider 31 may slide relative to the first chute.

Optionally, the first slider 31 is provided on the first support portion 1, and the first chute 32 is provided on the second support portion 2; or the first slider 31 is provided on the second support portion 2, and the first chute 32 is provided on the first support portion 1.

In this embodiment, the electronic device may be a scrollable-screen device with a variable size. The first support portion 1 and the second support portion 2 are configured to support a flexible display panel of the electronic device. The guiding structure 3 is connected to the first support portion 1 and the second support portion 2, respectively. The guiding structure 3 is driven by a drive structure of the electronic device to guide the first support portion 1 and the second support portion 2 to move relative to each other, implementing retraction or expansion of the flexible display panel and thereby implementing a size change. FIG. 1 is a schematic diagram of a state of fitting between the first support portion 1 and the second support portion 2 when the flexible display panel is in a retracted state.

The guiding structure 3 includes a first slider 31 and a first chute 32. The first slider 31 may be fastened on the first support portion 1, and in this case, the first chute 32 is fastened on the second support portion 2. Alternatively, the first slider 31 is fastened on the second support portion 2, and in this case, the first chute 32 is fastened on the first support portion 1. The first slider 31 may slide in the first chute 32, to drive relative movement between the first support portion 1 and the second support portion 2.

An end portion of the first slider 31 for slidably connecting to the first chute 32 may be clamped into the first chute 32 to prevent the first slider 31 from being detached from the first chute 32 and enhance a capability of Y-direction locking between the first slider 31 and the first chute 32, thereby ensuring the stability of an electronic device with a scrollable screen during use.

Optionally, the first slider 31 includes a first guide bar 311 and a second guide bar 312 that is connected to the first guide bar 311 at a first angle.

The first chute 32 includes a first chute body 321 and a second chute body 322 that is connected to the first chute body 321 at the first angle.

When the first slider 31 is located in the first chute 32, the first guide bar 311 is located in the first chute body 321, and the second guide bar 312 is located in the second chute body 322.

Figure 4:
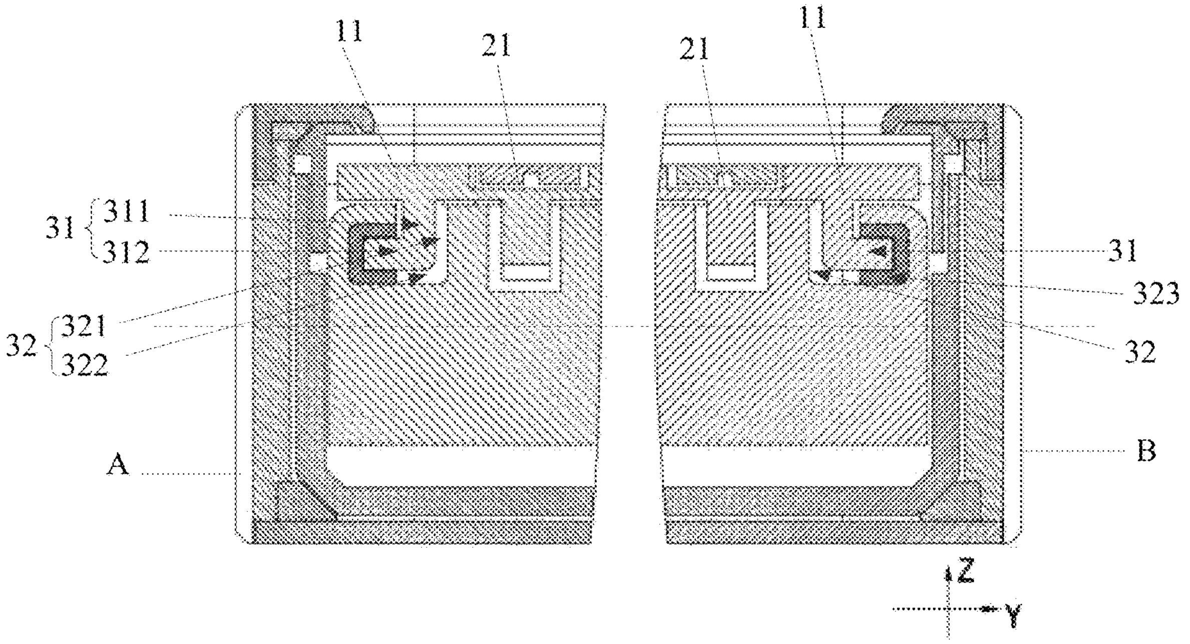
FIG. 4 is a schematic cross-sectional view of a structure of the part A and a structure of part B in FIG. 1 in a Y direction according to an embodiment of this application.

FIG. 4 is a schematic cross-sectional view of a structure of the part A and a structure of part B in FIG. 1 in a Y direction. In this embodiment, the first slider 31 includes a first guide bar 311 and a second guide bar 312 that are sequentially connected. The first guide bar 311 is a partial slider in a vertical direction in FIG. 4, and the second guide bar 312 is a partial slider in a horizontal direction. The first chute 32 includes a first chute body 321 and a second chute body 322 that are connected. The first chute body 321 is a partial chute body in the vertical direction, and the second chute body 322 is a partial chute body in the horizontal direction. The first guide bar 311 is located in the first chute body 321, and the second guide bar 312 is located in the second chute body 322.

The first guide bar 311 and the second guide bar 312 are connected at the first angle. To ensure that the first slider 31 slides smoothly in the first chute 32, the first chute body 321 and the second chute body 322 are also connected at the first angle.

Optionally, the first angle is greater than 0 degrees and less than or equal to 90 degrees. As shown in FIG. 2 and FIG. 4, the first angle is 90 degrees, the first guide bar 311 and the second guide bar 312 are bent to form a "J"-shaped structure, the first chute body 321 and the second chute body 322 are connected to form a "J"-shaped structure, and the first slider 31 is clamped into the first chute 32 to reduce a degree of freedom of the guiding structure in the Y direction, ensure that the first slider 31 is not detached from the first chute 32, and improve guiding stability for the screen.

Figure 7:
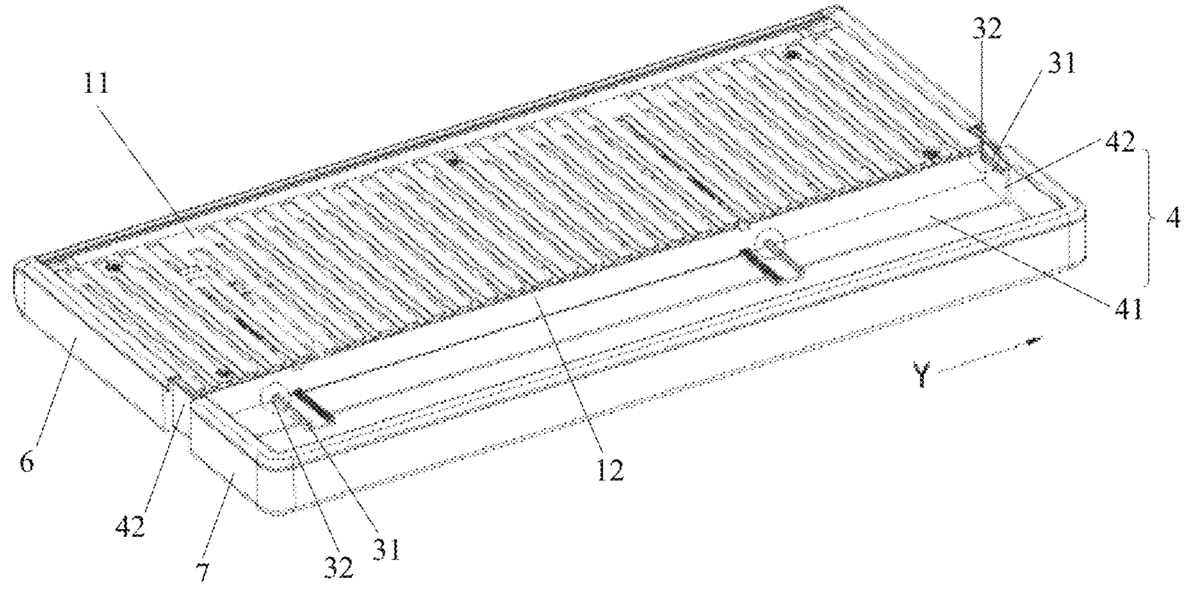
FIG. 7 is a second schematic structural diagram of an electronic device according to an embodiment of this application.

Optionally, the first angle may alternatively be 180 degrees. To be specific, as shown in FIG. 7, no bending occurs (at a location indicated by a circle in FIG. 7) between the first guide bar 311 and the second guide bar 312, and no bending occurs between the first chute body 321 and the second chute body 322. A cross-sectional area of the second guide bar 312 in a length direction is greater than a cross-sectional area of the first guide bar 311 in a length direction. A cross-sectional area of the second chute body 322 in a length direction is greater than a cross-sectional area of the first chute body 321 in a length direction. In this case, the second guide bar 312 may be clamped into the second chute body 322 and is not easily detached.

Figure 5:
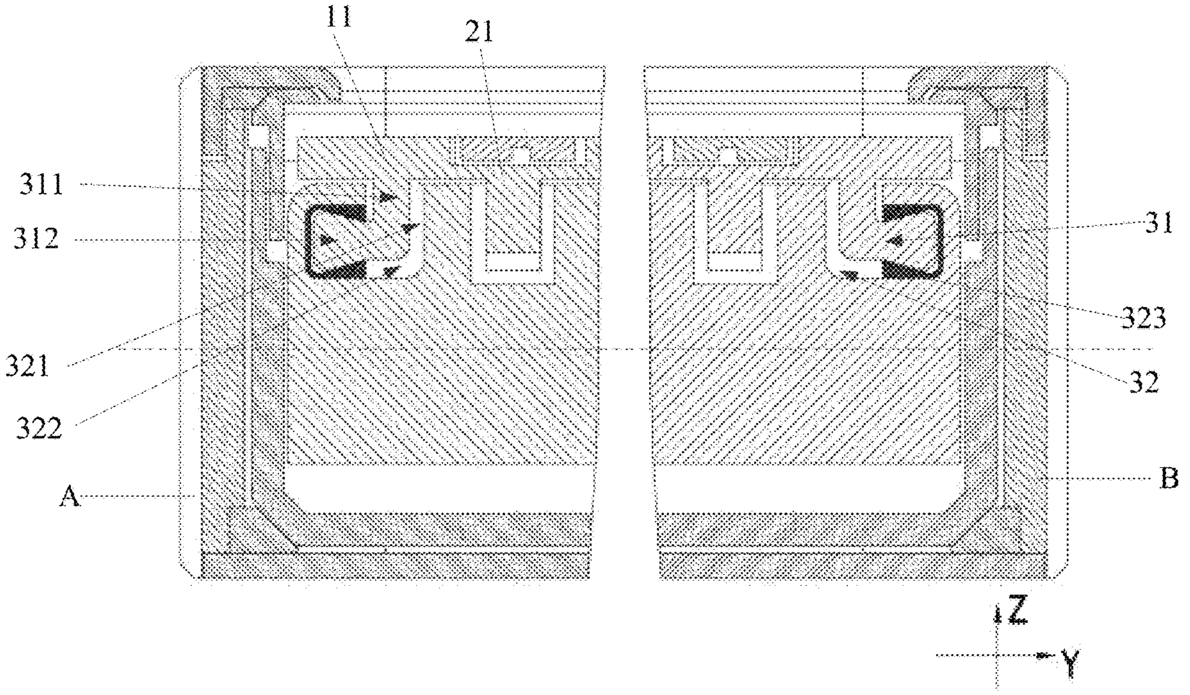
FIG. 5 is a partial schematic diagram of a cross section perpendicular to a sliding direction of a first slider according to an embodiment of this application.
Figure 6:
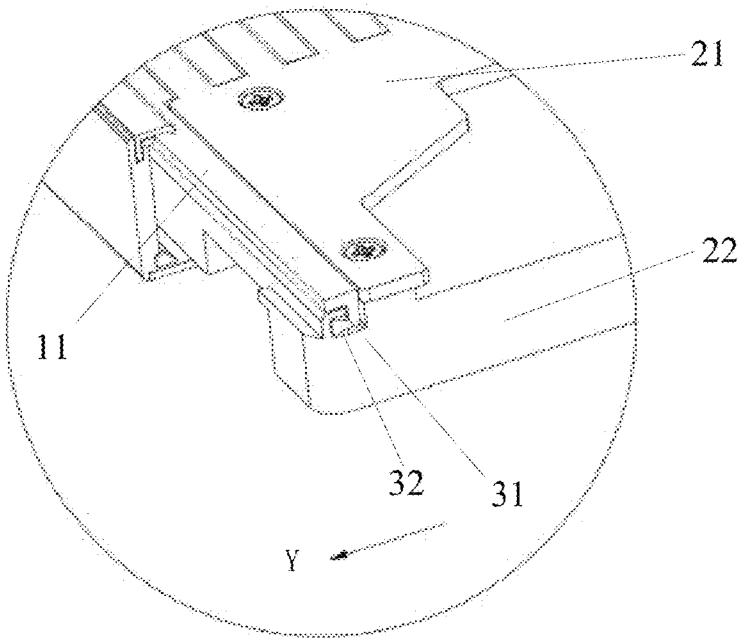
FIG. 6 is a second partial schematic enlarged view of the part A in FIG. 1 according to an embodiment of this application.

Optionally, in a cross section, of the second guide bar 312, that is perpendicular to a sliding direction of the first slider 31, a width of a first end connected to the first guide bar 311 is less than a width of a second end away from the first guide bar 311. FIG. 5 is a partial schematic diagram of a cross section A-A perpendicular to a sliding direction of the first slider 31. In the cross section of the second guide bar 312, a width of an end away from the first guide bar 311 (namely, an end adjacent to a chute bottom of the second chute body 322) is greater than a width of an end, connected to the first guide bar 311, of the second guide bar 312, so that the second guide bar 312 forms a swallow-tailed shape. FIG. 6 is a partial schematic enlarged view of the part A in FIG. 1. The first slider 31 is in a "J" shape, the second guide bar 312 forms a swallow-tailed shape, and the second guide bar 312 may be clamped into the second chute body 322.

It should be noted that the shape of the second guide bar 312 in this embodiment of this application is merely an example for description, and the second guide bar 312 may alternatively be provided in another shape capable of implementing clamping into the second chute body 322. For example, in the cross section perpendicular to the sliding direction of the first slider 31, a shape of the second guide bar 312 is a circular shape, an elliptic shape, a rectangular shape, or the like, to ensure that when the first slider 31 is located in the first chute 32, the first guide bar 311 is located in the first chute body 321, and the second guide bar 312 is located in the second chute body 322. In addition, because of the shape of the second guide bar 312, the second guide bar 312 can be clamped into the second chute body 322 without being detached in the Y direction.

Optionally, in a cross section, of the first chute 32, that is perpendicular to the sliding direction of the first slider 31, a width of an opening of the second chute body 322 is less than a width of a chute bottom of the second chute body 322.

In this embodiment, the first slider 31 needs to fit with the first chute 32. Therefore, in the cross section perpendicular to the sliding direction of the first slider 31, the width of the opening of the second chute body 322 is less than the width of the chute bottom of the second chute body 322, so that the second chute body 322 forms a swallow-tailed shape.

It should be noted that the shape of the second chute body 322 in this embodiment of this application is merely an example for description, and the second chute body 322 may alternatively be provided in another shape capable of implementing clamping of the first slider 31. For example, in the cross section perpendicular to the sliding direction of the first slider 31, a shape of the second chute body 322 is a circular shape, an elliptic shape, a rectangular shape, or the like, to ensure that when the first slider 31 is located in the first chute 32, the second guide bar 312 can be clamped into the second chute body 322 without being detached in the Y direction because of the shapes of the second guide bar 312 and the second chute body 322.

In an optional embodiment, as shown in FIG. 1 to FIG. 3, FIG. 7, and FIG. 8, the first support portion 1 includes a first comb bracket 11 and a first support bracket 12 fastened to the first comb bracket 11, where the first support bracket 12 is located at the bottom of the first comb bracket 11; and the second support portion 2 includes a second comb bracket 21 and a second support bracket 22 fastened to the second comb bracket 21, where the second support bracket 22 is located at the bottom of the second comb bracket 21.

The second comb bracket 21 has a plug-in portion arranged in a comb shape, and the first comb bracket 11 has a plug-in slot adapting to the plug-in portion. When the first slider 31 slides in the first chute 32, the plug-in portion slides in the plug-in slot, and the first support portion 1 and the second support portion 2 move relative to each other.

Figure 8:
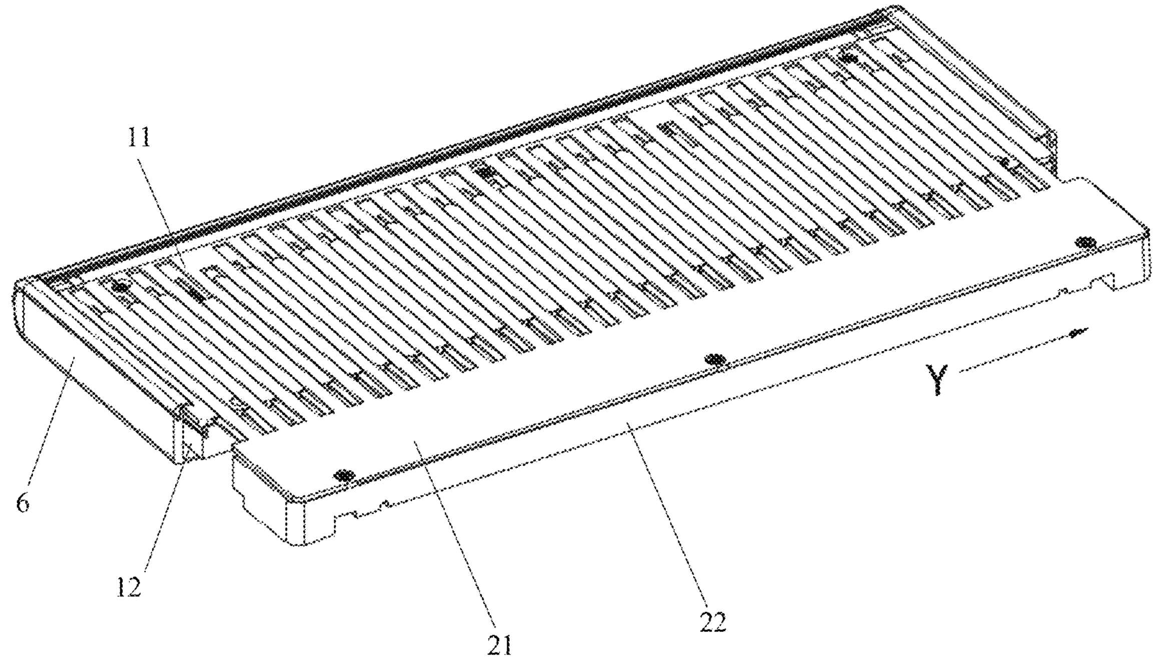
FIG. 8 is a third schematic structural diagram of an electronic device according to an embodiment of this application.

In this embodiment, as shown in FIG. 8, the first support bracket 12 is provided on a side, facing away from the flexible display panel, of the first comb bracket 11. To be specific, a first side of the first comb bracket 11 is used for supporting the flexible display panel, and the first support bracket 12 is provided on a second side opposite to the first side. The first support bracket 12 is provided under the first comb bracket 11 to support the first comb bracket 11. The second support bracket 22 is provided on a side, facing away from the flexible display panel, of the second comb bracket 21. To be specific, a first side of the second comb bracket 21 is used for supporting the flexible display panel, and the second support bracket 22 is provided on a second side opposite to the first side. The second support bracket 22 is provided under the second comb bracket 21 to support the second comb bracket 21.

In this embodiment, the first comb bracket 11 and the second comb bracket 21 are brackets located under the flexible display panel to carry the screen. The first comb bracket 11 and the first support bracket 12 under the first comb bracket 11 (to be specific, the first support bracket 12 is fastened on the side, facing away from the flexible display panel, of the first comb bracket 11) may be fastened into a whole by using a screw. The second comb bracket 21 and the second support bracket 22 under the second comb bracket 21 (to be specific, the second support bracket 22 is fastened on the side, facing away from the flexible display panel, of the second comb bracket 21) may be fastened into a whole by using a screw. When the flexible display panel has a smallest size, in other words, when the flexible display panel is in a folded state, the plug-in portion of the second comb bracket 21 is inserted into the plug-in slot of the first comb bracket 11, and the first comb bracket 11 tightly fits with the second comb bracket 21. When the screen is unfolded, to be specific, when the flexible display panel has a largest size, in other words, when the flexible display panel is in an unfolded state, the second comb bracket 21 and the first comb bracket 11 are away from each other while facing each other.

During folding or unfolding of the flexible display panel, the first comb bracket 11 and the first support bracket 12 as a whole and the second comb bracket 21 and the second support bracket 22 as a whole move relative to each other.

Optionally, as shown in FIG. 4 and FIG. 5, the first chute 32 further includes a first plastic structure 323 provided in the second chute body 322, the first plastic structure 323 includes first accommodation space, and a shape of the first accommodation space is the same as that of the second guide bar 312.

In this embodiment, both the first chute 32 and the first slider 31 may be made of a metal material. To reduce friction, improve service life of the slider and the chute, and reduce friction noise, wear-resistant plastic, namely, the first plastic structure 323, may be provided in the second chute body 322 of the first chute 32. The first plastic structure 323 is attached to an inner wall of the second chute body 322. To ensure that a fitting gap between the first plastic structure 323 and the first slider 31 is the smallest, a shape of accommodation space (for carrying the second guide bar 312) formed by the first plastic structure 323 is the same as that of the second guide bar 312. For example, when a cross section of the second guide bar 312 is rectangular, a cross section of the accommodation space of the first plastic structure 323 is also rectangular; or when a cross section of the second guide bar 312 is in a swallow-tailed shape, a cross section of the accommodation space of the first plastic structure 323 is also in a swallow-tailed shape.

Figure 9:
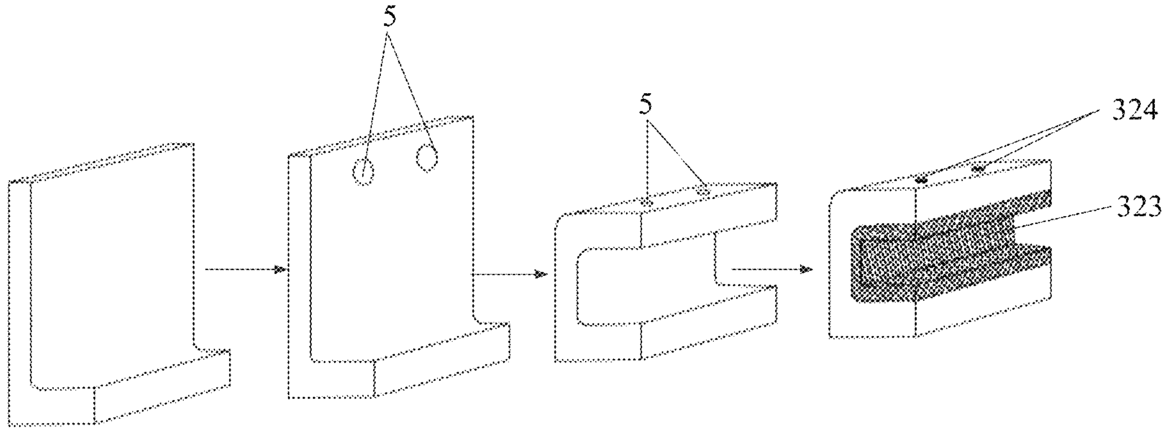
FIG. 9 is a schematic diagram of a manufacturing and assembly process of a second chute body and wear-resistant plastic according to an embodiment of this application.

Optionally, as shown in FIG. 9, a side wall of the second chute body 322 is provided with a through hole 5, the through hole is filled with a second plastic structure 324, and the second plastic structure 324 and the first plastic structure 323 are an integrated structure.

In this embodiment, the second chute body 322 includes a chute and wear-resistant plastic, and the second chute body 322 may be obtained by bending a metal component. A manufacturing and assembly process of the second chute body 322 and the wear-resistant plastic is shown in FIG. 9. First, a retaining through hole (namely, the through hole 5) is provided at a corresponding location on the metal component. Then the metal component with the hole is bent to form a “C”-like shape, and the wear-resistant plastic is injected into the “C”-shaped second chute body 322. During injection molding, the retaining through hole is filled with the wear-resistant plastic, so that the wear-resistant plastic performs retaining and fastening functions.

In this embodiment of this application, the first slider 31 may be provided on the first support portion 1 or the second support portion 2, and the first chute 32 may be provided on the second support portion 2 or the first support portion 1. This is described below by using embodiments.

In an optional embodiment, the first slider 31 is provided on a first surface of the first comb bracket 11, the first surface is a surface parallel to a length direction of the plug-in slot, the first chute 32 is provided on a second surface of the second support bracket 22, and the second surface is a surface parallel to a length direction of the plug-in portion. A sliding direction of the first slider 31 in the first chute 32 is the same as the length directions of the plug-in slot and the plug-in portion.

In this embodiment, as shown in FIG. 1 and FIG. 2, the first slider 31 is provided on the first surface of the first comb bracket 11 (namely, two side surfaces of the first comb bracket 11 in the Y direction shown in FIG. 1), and the first slider 31 may be in a “J” shape (a black part shown in FIG. 2). As shown in FIG. 2, an upper end portion of the “J”-shaped first slider 31 is fastened to a side surface of the first comb bracket 11, and a lower end portion (namely, a bent part) of the “J”-shaped first slider 31 extends downward into the first chute 32.

The first chute 32 is provided on a second side surface of the second support bracket 22 (namely, two side surfaces of the second support bracket 22 in the Y direction shown in FIG. 1), and the first chute 32 may be in a “J” shape (as shown in FIG. 2, the “J”-shaped first slider 31 is clamped into the “J”-shaped first chute 32), to fit with the first slider 31 through clamping. When the first slider 31 slides in the first chute 32, the first comb bracket 11 and the first support bracket 12 are driven to perform relative movement together.

As shown in FIG. 4, in this embodiment, a first plastic structure 323 may be provided in the second chute body 322 of the first chute 32. When the second guide bar 312 (namely, a partial guide bar bent in the Y direction shown in FIG. 4) of the first slider 31 is located in the second chute body 322 (namely, a partial chute body bent in the Y direction shown in FIG. 4), the second guide bar 312 and the first plastic structure 323 (a C-shaped structure on a side A and a C-shaped structure on a side B shown in FIG. 4) fit with each other through clamping. A shape of internal space formed by the first plastic structure 323 through bending is the same as that of an end portion of the second guide bar 312, to reduce friction, improve service life of the slider, and reduce friction noise. This reduces a fitting gap between the first chute 32 and the first slider 31, to prevent the first slider 31 from being detached.

In this embodiment, optionally, as shown in FIG. 5, in a cross section, of the second guide bar 312, that is perpendicular to a sliding direction of the first slider 31, a width of a first end connected to the first guide bar 311 is less than a width of a second end away from the first guide bar 311 (an end extending to a chute bottom of the second chute body 322 is the second end of the second guide bar 312). To be specific, the second guide bar 312 is provided in a swallow-tailed shape, and the second chute body 322 may also be provided in a swallow-tailed shape. Alternatively, the second chute body 322 is still in an ordinary rectangular shape, and internal accommodation space of the first plastic structure 323 in the second chute body 322 is provided in the swallow-tailed shape. To be specific, a shape of the internal accommodation space of the first plastic structure 323 is the same as that of the second guide bar 312. As shown in FIG. 4 and FIG. 5, the second guide bar 312 is located in the internal accommodation space of the first plastic structure 323. In addition, because the shape of the internal accommodation space of the first plastic structure 323 matches that of the second guide bar 312, friction can be reduced, and a fitting gap between the first chute 32 and the first slider 31 can be reduced.

In an optional embodiment, as shown in FIG. 7, the electronic device further includes a middle frame 4. The middle frame 4 is provided at the bottom of the first support bracket 12 and the second support bracket 22, and the middle frame 4 is fastened to the second support bracket 22.

The middle frame 4 includes a bottom plate 41 and a side plate 42 connected to the bottom plate 41. The bottom plate 41 is located at the bottom of the first support bracket 12 and the second support bracket 22. The side plate 42 is located on side surfaces of the first support bracket 12 and the second support bracket 22.

In this embodiment, the middle frame 4 is provided at the bottom of the first support bracket 12 and the second support bracket 22. As shown in FIG. 7, the bottom plate 41 and the side plate 42 of the middle frame 4 form a semi-enclosed groove shape that semi-encloses the first support bracket 12 from the bottom of the first support bracket 12. The middle frame 4 is fastened to the second support bracket 22. When the first support portion 1 and the second support portion 2 move relative to each other, the middle frame 4 moves with the second support portion 2.

FIG. 7 shows only a structure of the first support bracket 12. It should be noted that, because the first support bracket 11 above the first support bracket 12 and the second support bracket 21 above the second support bracket 22 are plugged into each other and can move relative to each other, the middle frame 4 semi-encloses the first support bracket 12 and the second support bracket 22, and the middle frame 4 encloses the bottom and the side surfaces of the first support bracket 12 and the second support bracket 22. The middle frame 4 includes a bottom plate 41 and a side plate 42 connected to the bottom plate 41. The bottom plate 41 is located at the bottom of the first support bracket 12 and the second support bracket 22. The side plate 42 is located on side surfaces of the first support bracket 12 and the second support bracket 22.

Optionally, as shown in FIG. 7 and FIG. 8, the first chute 32 is provided on a third surface of the first support bracket 12, the first slider 31 is provided on the side plate 42, and the third surface is opposite the side plate 42. To be specific, the third surface is a side surface adjacent to the side plate 42. As shown in FIG. 7, the first chute 32 is provided on the third surface, adjacent to the side plate 42, of the first support bracket 12, the first slider 31 is fastened to the side plate 42, and the first slider 31 is clamped into the first chute 32;

and/or the first chute 32 is provided at the bottom of the first support bracket 12, and the first slider 31 is provided on the bottom plate 41. As shown in FIG. 7, the first chute 32 is provided at the bottom of the first support bracket 12, the first slider 31 is fastened to the bottom plate 41, and the first slider 31 is clamped into the first chute 32.

In this embodiment, the first chute 32 and the first slider 31 may be provided on a side surface of the first support bracket 12 and the side plate 42 of the middle frame 4 respectively. The third side surface is a side surface (a location indicated by a circle on the right in FIG. 7), adjacent to the side plate 42, of the first support bracket 12. The first chute 32 is provided on the side surface of the first support bracket 12. Because a length of the first support bracket 12 in the Y direction is long, a groove is provided inward to save internal space of the electronic device. The first slider 31 is provided at a location, on the side plate 42, that is adjacent to the side surface of the first support bracket 12. The first slider 31 fits with the first chute 32. When the first slider 31 sides relative to the first chute 32, the first slider 31 drives the middle frame 4, the second support bracket 22, and the second comb bracket 21 to perform relative movement together, and the first chute 32 drives the first support bracket 12 and the first comb bracket 11 to perform relative movement together.

Optionally, alternatively, the first chute 32 may be provided at the bottom of the first support bracket 12, and the first slider 31 may be provided on the bottom plate 41 of the middle frame 4, where locations are indicated by circles on the left and in the middle in FIG. 7. The first slider 31 fits with the first chute 32. When the first slider 31 sides relative to the first chute 32, the first slider 31 drives the middle frame 4, the second support bracket 22, and the second comb bracket 21 to perform relative movement together, and the first chute 32 drives the first support bracket 12 and the first comb bracket 11 to perform relative movement together.

Optionally, as shown in FIG. 7 and FIG. 8, the electronic device further includes: a first housing 6 that covers the first support portion 1, and a second housing 7 that covers the second support portion 2. The first comb bracket 11 and the first support bracket 12 are connected as a whole by using a screw. The second comb bracket 21 and the second support bracket 22 are also connected by using a screw. The middle frame 4 is provided at the bottom of the first support bracket 12 and the second support bracket 22, and is fastened to the second support bracket 22. The first housing 6 is fastened to the first support bracket 12. The second support bracket 22 is fastened to the middle frame 4. When the flexible display panel is folded, the first comb bracket 11 is closely matched with the second comb bracket 21, and the first housing 6 tightly fits with the second housing 7. When the flexible display panel is unfolded, the first comb bracket 11 and the second comb bracket 21 are away from each other while facing each other, the first housing 6 is separated from the second housing 7, and the middle frame 4 is exposed with movement of the first housing 6 and the second housing 7. The first chute 32 is provided at two ends of the first support bracket 12 and/or at a bottom surface (a surface facing away from the flexible display screen) of the first support bracket 12, and the first slider 31 is provided on an inner side of the side plate and/or on the bottom plate of the middle frame 4.

During unfolding of the screen, the first slider 31 on the middle frame 4 slides outward along the first chute 32 on the first support bracket 12, to drive the first comb bracket 11 and the second comb bracket 21 to slide relative to each other, and guide unfolding of the flexible display panel. During folding of the flexible display panel, the first slider 31 on the middle frame 4 slides inward along the first chute 32 on the first support bracket 12, to drive the first comb bracket 11 and the second comb bracket 21 to slide relative to each other, and guide retraction of the flexible display panel.

It should be noted that, in this embodiment of this application, relative sliding between the first slider 31 and the first chute 32 may be driven by a driving apparatus. For example, the first support portion 1 and the second support portion 2 are driven through fitting between a rotating wheel and a conveyor belt, so that the first slider 31 performs relative sliding in the first chute 32. A specific driving process is not limited in this embodiment of this application.

In this embodiment of this application, the first slider and the first chute of the guiding structure are clamped, so that fitting between the first slider and the first chute can be more secure, to prevent the first slider from being detached. The first slider and the first chute may be provided in a "J" shape, so that a fitting gap between the first slider and the first chute is smaller, to save space in the Y direction and reduce a degree of freedom in the Y direction. This improves guiding stability for the screen, and improves user experience. Optionally, alternatively, the first chute may be provided at the bottom of the first support bracket, and the first slider may be provided on the bottom plate of the middle frame, so that a contact part between the first chute and the first slider is flat, to form lower-pair contact. Compared with a case in which a contact part between the first chute and the first slider is in a point contact form, in this embodiment of this application, friction and abrasion can be reduced, and conduction stability can be improved.

In addition, wear-resistant plastic may be provided in the first chute to reduce friction between a metal chute and a slider, improve service life of the chute and the slider, and reduce friction noise.

It should be noted that a connection relationship between the first support portion 1 and the second support portion 2 in this embodiment of this application may be a left-right horizontal arrangement shown in FIG. 2, and through slidable connection between the plug-in slot of the first comb bracket and the plug-in portion of the second comb bracket, the first slider 31 and the first chute 32 that fit with each other are respectively provided on side surfaces of the first support portion 1 and the second support portion 2. Alternatively, the first support portion 1 and the second support portion 2 are horizontally arranged on the left and right, and the first chute 32 and the first slider 31 that fit with each other are respectively provided at the bottom of the first support portion 1 and on the bottom plate of the middle frame 4 that encloses the first support portion 1 and the second support portion 2 from the bottom. Alternatively, one of the first support portion 1 and the second support portion 2 is horizontally placed, and the other is vertically placed. For example, the first support portion 1 is vertically placed, the second support portion 2 is horizontally placed, and the first support portion 1 is vertically arranged on the second support portion 2. The first slider 31 and the first chute 32 that fit with each other are respectively provided at locations at which the first support portion 1 is in contact with the second support portion 2, to implement relative movement of the first support portion 1 on the second support portion 2.

A mode of connection between the first support portion 1 and the second support portion 2 is not limited in this embodiment of this application. Regardless of any mode of connection between the first support portion 1 and the second support portion 2, the connection between the first support portion 1 and the second support portion 2 can be made more secure through fitting between the first slider 31 and the first chute 32 in the guiding structure 3 in this embodiment of this application.

It should be noted that the guiding structure in the embodiments of this application may be applied to a scrollable-screen device or another component or device with a similar structure, and the embodiments of this application are not limited to a detachable structure, and may also be applied to another similar assembly structure. This is not limited herein.

Other constituents, such as a display module and a housing, of the electronic device and operations according to the embodiments of the present invention are known to a person of ordinary skill in the art. Details are not described herein.

In descriptions of this specification, descriptions with reference to the term "an embodiment", "some embodiments", "exemplary embodiment", "example", "specific example", "some examples", or the like mean that a specific feature, structure, material, or characteristic described with reference to the embodiment or example is included in at least one embodiment or example of the present invention. In this specification, exemplary descriptions of the foregoing terms do not necessarily indicate a same embodiment or example. In addition, specific features, structures, materials, or characteristics in descriptions may be combined in a proper manner in any one or more embodiments or examples.

Although the embodiments of the present invention are shown and described, a person of ordinary skill in the art can understand that various changes, modifications, replacements, and variations may be made to these embodiments without departing from the principle or essence of the present invention. The scope of the present invention is limited by the claims and their equivalents.

What is claimed is:

1. An electronic device, comprising:

a first support portion;

a second support portion; and a guiding structure, wherein the guiding structure is connected to the first support portion and the second support portion, the guiding structure comprises a first slider and a first chute, and an end portion of the first slider is clamped into the first chute; and when the first slider slides in the first chute, the first support portion and the second support portion move relative to each other, wherein the first slider comprises a first guide bar and a second guide bar that is connected to the first guide bar at a first angle;

the first chute comprises a first chute body and a second chute body that is connected to the first chute body at the first angle; and when the first slider is located in the first chute, the first guide bar is located in the first chute body, and the second guide bar is located in the second chute body, wherein the first chute further comprises a first plastic structure provided in the second chute body; and the first plastic structure comprises first accommodation space, and a shape of the first accommodation space is the same as that of the second guide bar, wherein a side wall of the second chute body is provided with a through hole, and the through hole is filled with a second plastic structure; and the second plastic structure and the first plastic structure are an integrated structure.

2. The electronic device according to claim 1, wherein in a cross section, of the second guide bar, that is perpendicular to a sliding direction of the first slider, a width of a first end connected to the first guide bar is less than a width of a second end away from the first guide bar.

3. The electronic device according to claim 1, wherein in a cross section, of the first chute, that is perpendicular to the sliding direction of the first slider, a width of an opening of the second chute body is less than a width of a chute bottom of the second chute body.

4. The electronic device according to claim 2, wherein in a cross section, of the first chute, that is perpendicular to the sliding direction of the first slider, a width of an opening of the second chute body is less than a width of a chute bottom of the second chute body.

5. The electronic device according to claim 1, wherein the first angle is greater than 0 degrees and less than or equal to 90 degrees.

6. The electronic device according to claim 1, wherein the first support portion comprises a first comb bracket and a first support bracket fastened to the first comb bracket, and the first support bracket is located at the bottom of the first comb bracket; and the second support portion comprises a second comb bracket and a second support bracket fastened to the second comb bracket, and the second support bracket is located at the bottom of the second comb bracket, wherein the second comb bracket has a plug-in portion arranged in a comb shape, the first comb bracket has a plug-in slot adapting to the plug-in portion, and when the first slider slides in the first chute, the plug-in portion slides in the plug-in slot, and the first support portion and the second support portion move relative to each other.

7. The electronic device according to claim 6, wherein the first slider is provided on a first surface of the first comb bracket, the first surface is a surface parallel to a length direction of the plug-in slot, the first chute is provided on a second surface of the second support bracket, and the second surface is a surface parallel to a length direction of the plug-in portion; and a sliding direction of the first slider in the first chute is the same as the length directions of the plug-in slot and the plug-in portion.

8. The electronic device according to claim 6, wherein the electronic device further comprises a middle frame, the middle frame is provided at the bottom of the first support bracket and the second support bracket, and the middle frame is fastened to the second support bracket; and the middle frame comprises a bottom plate and a side plate connected to the bottom plate, the bottom plate is located at the bottom of the first support bracket and the second support bracket, and the side plate is located on side surfaces of the first support bracket and the second support bracket.

9. The electronic device according to claim 8, wherein the first chute is provided on a third surface of the first support bracket, the first slider is provided on the side plate, and the third surface is opposite the side plate;

and/or the first chute is provided at the bottom of the first support bracket, and the first slider is provided on the bottom plate.

* * * * *